(12) United States Patent
Vanderlaan et al.

(10) Patent No.: US 7,776,238 B2
(45) Date of Patent: Aug. 17, 2010

(54) METHODS AND SYSTEMS FOR LEACHING SILICONE HYDROGEL OPHTHALMIC LENSES

(76) Inventors: Douglas G. Vanderlaan, 1453 N. Market St., Jacksonville, FL (US) 32206; Dharmesh K. Dubey, 9087 Starpass Dr., Jacksonville, FL (US) 32256; James D. Ford, 515 Nessau Ct., Orange Park, FL (US) 32003; Frank F. Molock, Jr., 1543 Wildhorn Dr., Orange Park, FL (US) 32003

( * ) Notice: Subject to any disclaimer, the term of this patent is extended or adjusted under 35 U.S.C. 154(b) by 307 days.

(21) Appl. No.: 11/612,545

(22) Filed: Dec. 19, 2006

(65) Prior Publication Data

US 2007/0182918 A1 Aug. 9, 2007

Related U.S. Application Data

(60) Provisional application No. 60/751,783, filed on Dec. 20, 2005.

(51) Int. Cl.
*A61L 12/00* (2006.01)

(52) U.S. Cl. .................................... 264/2.6; 351/159
(58) Field of Classification Search .................. 264/2.6; 351/159, 177
See application file for complete search history.

(56) References Cited

U.S. PATENT DOCUMENTS

| 5,910,518 | A * | 6/1999 | Nakada et al. | 523/106 |
| 6,528,465 | B1 * | 3/2003 | Cantoro | 510/112 |
| 2002/0040511 | A1 * | 4/2002 | Ryser | 8/506 |
| 2004/0091613 | A1 * | 5/2004 | Wood et al. | 427/162 |
| 2006/0186564 | A1 * | 8/2006 | Adams et al. | 264/1.32 |

FOREIGN PATENT DOCUMENTS

| DE | 4238424 | | 5/1994 |
| EP | 1270189 | A * | 2/2003 |
| WO | WO 2003082367 | A2 | 10/2003 |
| WO | WO 2005/097960 | | 10/2005 |

* cited by examiner

*Primary Examiner*—Steven P Griffin
*Assistant Examiner*—Saeed M Huda
(74) *Attorney, Agent, or Firm*—Joseph P. Kincart

(57) ABSTRACT

This invention includes methods and systems for processing hydrogel lenses using aqueous solutions as leaching aids.

19 Claims, No Drawings

METHODS AND SYSTEMS FOR LEACHING SILICONE HYDROGEL OPHTHALMIC LENSES

RELATED PATENT APPLICATIONS

This application claims priority to Provisional Patent Application U.S. Ser. No. 60/751,783 which was filed on Dec. 20, 2005.

FIELD OF THE INVENTION

This invention relates to a process to produce ophthalmic lenses made from silicone hydrogels. More specifically, the present invention relates to methods and systems for leaching components from an ophthalmic lens.

BACKGROUND OF THE INVENTION

It is well known that contact lenses can be used to improve vision. Various contact lenses have been commercially produced for many years. Early designs of contact lenses were fashioned from hard materials. Although these lenses are still currently used in some applications, they are not suitable for all patients due to their poor comfort and relatively low permeability to oxygen. Later developments in the field gave rise to soft contact lenses, based upon hydrogels.

Hydrogel contact lenses are very popular today. These lenses are often more comfortable to wear than contact lenses made of hard materials. Malleable soft contact lenses can be manufactured by forming a lens in a multi-part mold where the combined parts form a topography consistent with the desired final lens.

Multi-part molds used to fashion hydrogels into a useful article, such as an ophthalmic lens, can include for example, a first mold portion with a convex surface that corresponds with a back curve of an ophthalmic lens and a second mold portion with a concave surface that corresponds with a front curve of the ophthalmic lens. To prepare a lens using such mold portions, an uncured hydrogel lens formulation is placed between the concave and convex surfaces of the mold portions and subsequently cured. The hydrogel lens formulation may be cured, for example by exposure to either, or both, heat and light. The cured hydrogel forms a lens according to the dimensions of the mold portions.

Following cure, traditional practice dictates that the mold portions are separated and the lens remains remains adhered to one of the mold portions. A release process detaches the lens from the remaining mold part. The extraction step removes unreacted components and diluents (hereinafter referred to as "UCDs") from the lens and affect clinical viability of the lens. If the UCDs are not extracted from the lens, they may make the lens uncomfortable to wear.

According to prior art, release of the lens from the mold can be facilitated by exposure of the lens to aqueous or saline solutions which act to swell the lens and loosen adhesion of the lens to the mold. Exposure to the aqueous or saline solution can additionally serve to extract UCDs and thereby make the lens more comfortable to wear and clinically acceptable.

New developments in the field have led to contact lenses that are made from silicone hydrogels. Known hydration processes using aqueous solutions to effect release and extraction have not been efficient with silicone hydrogel lenses. Consequently, attempts have been made to release silicone lenses and remove UCDs using organic solvents. Processes have been described in which a lens is immersed in an alcohol (ROH), ketone (RCOR'), aldehyde (RCHO), ester (RCOOR'), amide (RCONR'R") or N-alkyl pyrrolidone for 20 hours-40 hours and in the absence of water, or in an admixture with water as a minor component (see e.g., U.S. Pat. No. 5,258,490).

However, although some success has been realized with the known processes, the use of highly concentrated organic solutions can present drawbacks, including, for example: safety hazards; increased risk of down time to a manufacturing line; high cost of release solution; and the possibility of collateral damage, due to explosion.

Therefore, it would be advantageous to find a method of producing a silicone hydrogel contact lens which requires the use of little or no organic solvent, avoids the use of flammable agents, that effectively releases lenses from the molds in which they were formed, and which removes UCDs from the lens.

SUMMARY OF THE INVENTION

Accordingly, the present invention provides methods of leaching a silicone hydrogel ophthalmic lens of UCDs without soaking the lens in organic solvents. According to the present invention, release of a silicone hydrogel lens from a mold in which the lens is formed is facilitated by exposing the lens to an aqueous solution of an effective amount of a release aid. In addition, leaching of UCDs from the lens is also facilitated by exposing the lens to an aqueous solution of an effective amount of a leach aid.

In addition, the present invention relates generally to ophthalmic lenses fashioned from materials including wettable silicone hydrogels formed from a reaction mixture including at least one high molecular weight hydrophilic polymer and at least one hydroxyl-functionalized silicone-containing monomer. In some embodiments, the ophthalmic lenses are formed from a reaction mixture including a high molecular weight hydrophilic polymer and an effective amount of an hydroxyl-functionalized silicone-containing monomer.

In other embodiments, the present invention relates to a method of preparing an ophthalmic lens which includes mixing a high molecular weight hydrophilic polymer and an effective amount of a hydroxyl-functionalized silicone-containing monomer to form a clear solution, and curing said solution. Some embodiments can therefore include one or more of (a) mixing a high molecular weight hydrophilic polymer and an effective amount of an hydroxyl-functionalized silicone-containing monomer; and (b) curing the product of step (a) to form a biomedical device and curing the product of step (a) to form a wettable biomedical device.

In some embodiments, the present invention still further relates to an ophthalmic lens formed from a reaction mixture including at least one hydroxyl-functionalized silicone-containing monomer and an amount of high molecular weight hydrophilic polymer sufficient to incorporate into the lens, without a surface treatment, an advancing contact angle of less than about 80.degree.

DETAILED DESCRIPTION OF THE INVENTION

It has been found that a silicone hydrogel ophthalmic lens can be released from a mold in which it was cured by exposing the cured lens to an aqueous solution of an effective amount of a release aid. It has also been found that adequate removal of Leachable Materials from the silicone hydrogel ophthalmic lens can be realized by exposing the cured lens to an aqueous solution of an effective amount of a leach aid.

DEFINITIONS

As used herein, "adequate removal of Leachable Materials" means that at least 50%, of the Leachable Materials have been removed from a lens after treating the lens.

As used herein, "Leachable Material" includes UCD's and other material which is not bound to the polymer and may be extracted from the polymer matrix, for example, by leaching with water or an organic solvent.

As used herein, a "Leaching Aid" is any compound that if used in an effective amount in an aqueous solution to treat a ophthalmic lens can yield a lens with an adequate amount of removal of Leachable Materials.

As used herein the term "monomer" is a compound containing at least one polymerizable group and an average molecular weight of about less than 2000 Daltons, as measured via gel permeation chromatography refractive index detection. Thus, monomers can include dimers and in some cases oligomers, including oligomers made from more than one monomeric unit.

As used herein, the term "Ophthalmic Lens" refers to devices that reside in or on the eye. These devices can provide optical correction, wound care, drug delivery, diagnostic functionality, cosmetic enhancement or effect or a combination of these properties. The term lens includes but is not limited to soft contact lenses, hard contact lenses, intraocular lenses, overlay lenses, ocular inserts, and optical inserts.

As used herein, a "release aid" is a compound or mixture of compounds, excluding organic solvents, which, when combined with water, decreases the time required to release a ophthalmic lens from a mold, as compared to the time required to release such a lens using an aqueous solution that does not comprise the release aid.

As used herein, "released from a mold" means that a lens is either completely separated from the mold, or is only loosely attached so that it can be removed with mild agitation or pushed off with a swab.

As used herein, the term "treat" means to expose a cured lens to an aqueous solution including at least one of: a leaching aid and a release aid.

As used herein and also defined above, the term "UCD" means unreacted components and diluents.

Treatment

According to the present invention, treatment can include exposing a cured lens to an aqueous solution which includes at least one of: a leaching aid and a release aid. In various embodiments, treatment can be accomplished, for example, via immersion of the lens in a solution or exposing the lens to a flow of solution. In various embodiments, treatment can also include, for example, one or more of: heating the solution; stirring the solution; increasing the level of release aid in the solution to a level sufficient to cause release of the lens; mechanical agitation of the lens; and increasing the level of leach aid in the solution to a level sufficient to facilitate adequate removal of UCDs from the lens.

By way of non-limiting examples, various implementations can include release and UCD removal that is accomplished by way of a batch process wherein lenses are submerged in a solution contained in a fixed tank for a specified period of time or in a vertical process where lenses are exposed to a continuous flow of a solution that includes at least one of a leach aid and a release aid.

In some embodiments, the solution can be heated with a heat exchanger or other heating apparatus to further facilitate leaching of the lens and release of the lens from a mold part. For example, heating can include raising the temperature of an aqueous solution to the boiling point while a hydrogel lens and mold part to which the lens is adhered are submerged in the heated aqueous solution. Other embodiments can include controlled cycling of the temperature of the aqueous solution.

Some embodiments can also include the application of physical agitation to facilitate leach and release. For example, the lens mold part to which a lens is adhered, can be vibrated or caused to move back and forth within an aqueous solution. Other embodiments may include ultrasonic waves through the aqueous solution.

These and other similar processes can provide an acceptable means of releasing the lens and removing UCDs from the lens prior to packaging.

Release

According to the present invention, release of a silicone hydrogel lens is facilitated by treating the lens with a solution including one or more release aids combined with water at concentrations effective for causing release of the lens. In some embodiments, release can be facilitated by the release solution causing a silicone hydrogel lens to swell by 10% or more in which percentage of swelling is equal to 100 times the diameter of lens in release aid solution/diameter of lens in borate-buffered saline.

In some embodiments, the release aid can include alcohols, such as, for example, $C_5$ to $C_7$ alcohols. Some embodiments can also include alcohols that are useful as release aids and include primary, secondary and tertiary alcohols with one to 9 carbons. Examples of such alcohols include methanol, ethanol, n-propanol, 2-propanol, 1-butanol, 2-butanol, tert-butanol, 1-pentanol, 2-pentanol, 3-pentanol, 2-methyl-1-butanol, tert-amyl alcohol, neopentyl alcohol, 1-hexanol, 2-hexanol, 3-hexanol, 2-methyl-1-pentanol, 3-methyl-1pentanol, 4-methyl-1-pentanol, 2-methyl-2-pentanol, 3-methyl-2-pentanol, 3-methyl-3-pentanol, 1-heptanol, 2-heptanol, 3-heptanol, 4-heptanol, 1-octanol, 2-octanol, 1-nonanol, and 2-nonanol. IN some embodiments, phenols may also be used.

In addition, in some embodiments of the present invention Leach Aids, which are further discussed below, can also be combined with alcohols to improve the rate of release. In some cases leach aids may be used as release aids without the addition of alcohols. For example, leach aids at concentrations greater than about 12%, or when used to release lenses with water soluble diluents such as t-amyl alcohol.

Lens Materials

Ophthalmic lenses suitable for use with the current invention include those made from silicone hydrogels. Silicone hydrogels offer benefits to ophthalmic lens wearers as compared to conventional hydrogels. For example, they typically offer much higher oxygen permeability, Dk, or oxygen oxygen/transmissibility, Dk/1, where 1 is the thickness of the lens. Such lenses cause reduced corneal swelling due to reduced hypoxia, and may cause less limbal redness, improved comfort and have a reduced risk of adverse responses such as bacterial infections. Silicone hydrogels are typically made by combining silicone-containing monomers or macromers with hydrophilic monomers or macromers.

Examples of silicone containing monomers include SiGMA (2-propenoic acid, 2-methyl-,2-hydroxy-3-[3-[1,3,3, 3-tetramethyl-1-[(trimethylsilyl)oxy]disiloxanyl]propoxy] propyl ester), α,ω)-bismethacryloxypropylpolydimethylsiloxane, mPDMS (monomethacryloxypropyl terminated mono-n-butyl terminated polydimethylsiloxane) and TRIS (3-methacryloxypropyltris(trimethylsiloxy)silane).

Examples of hydrophilic monomers include HEMA (2-hydroxyethylmethacrylate), DMA (N,N-dimethylacrylamide) and NVP (N-vinylpyrrolidone).

In some embodiments, high molecular weight polymers may be added to monomer mixes and serve the function of internal wetting agents. Some embodiments can also include additional components or additives, which are generally known in the art. Additives can include, for example: ultraviolet absorbing compounds and monomer, reactive tints, antimicrobial compounds, pigments, photochromic, release agents, combinations thereof and the like.

The silicone monomers and macromers are blended with the hydrophilic monomers or macromers, placed into ophthalmic lens molds, and cured by exposing the monomer to one or more conditions capable of causing polymerization of the monomer. Such conditions can include, for example: heat and light, wherein the light may include one or more of: visible, ionizing, actinic, X-ray, electron beam or ultra violet (hereinafter "UV") light. In some embodiments, the light utilized to cause polymerization can have a wavelength of about 250 to about 700 nm. Suitable radiation sources include UV lamps, fluorescent lamps, incandescent lamps, mercury vapor lamps, and sunlight. In embodiments, where a UV absorbing compound is included in the monomer composition (for example, as a UV block), curing can be conducted by means other than UV irradiation (such as, for example, by visible light or heat).

In some embodiments a radiation source, used to facilitate curing can be selected from UVA (about 315-about 400 nm), UVB (about 280-about 315) or visible light (about 400-about 450 nm), at low intensity. Some embodiments can also include a reaction that mixture includes a UV absorbing compound.

In some embodiments, wherein the lenses are cured using heat then a thermal initiator may be added to the monomer mix. Such initiators can include one or more of: peroxides such as benzoyl peroxide and azo compounds such as AIBN (azobisisobutyronirile).

In some embodiments, lenses can be cured using UV or visible light and a photoinitiator may be added to the monomer mix. Such photoinitiators may include, for example, aromatic alpha-hydroxy ketones, alkoxyoxybenzoins, acetophenones, acyl phosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2, 6-dimethoxybenzoyl)-2,4-4-trimethylpentyl phosphine oxide (DMBAPO), bis(2,4,6-trimethylbenzoyl)-phenylphosphineoxide (Irgacure 819), 2,4,6-trimethylbenzyldiphenyl phosphine oxide and 2,4,6-trimethylbenzyoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals).

In some embodiments, it may also be useful to include diluents in the monomer mix, for example to improve the solubility of the various components, or to increase the clarity or degree of polymerization of the polymer to be formed. Embodiments can include secondary and tertiary alcohols as diluents Various processes are known for processing the reaction mixture in the production of ophthalmic lenses, including known spincasting and static casting. In some embodiments, a method for producing an ophthalmic lens from a polymer includes molding silicone hydrogels. Silicone hydrogel molding can be efficient and provides for precise control over the final shape of a hydrated lens.

Molding an ophthalmic lens from a silicone hydrogel can include placing a measured amount of monomer mix in a concave mold part. A convex mold part is then placed on top of the monomer and pressed to close and form a cavity that defines a contact lens shape. The monomer mix within the mold parts is cured to form a contact lens. As used herein, curing the monomer mix includes a process or condition which allows or facilitates the polymerization of the monomer mix. Examples of conditions which facilitate polymerization include one or more of: exposure to light and application of thermal energy.

When the mold halves are separated the lens typically adheres to one or the other mold half. It is typically difficult to physically remove the lens from this mold half, and it is generally preferred to place this mold half into a solvent to release the lens. The swelling of the lens that results when the lens absorbs some of this solvent typically facilitates release of the lens from the mold.

Silicone hydrogel lenses may be made using relatively hydrophobic diluents such as 3,7-dimethyl-3-octanol. If one attempts to release such lenses in water, such diluents prevent absorption of water, and do not allow sufficient swelling to case release of the lens.

Alternatively, silicone hydrogels may be made using relatively hydrophilic and water soluble diluents such as ethanol, t-butanol or t-amyl alcohol. When such diluents are used and the lens and mold are placed into water, the diluent may more easily dissolve and the lens may more easily release in water than if more hydrophobic diluents are used.

Leachable Material

After a lens is cured the polymer formed typically contains some amount of material that is not bound to or incorporated into the polymer. Leachable Material not bound to the polymer may be extracted from the polymer matrix for example by leaching with water or an organic solvent (hereinafter "Leachable Material"). Such Leachable Material may not be favorable to the use of the contact lens in an eye. For example, Leachable Material may slowly be released from a contact lens when the contact lens is worn in an eye and may cause irritation or a toxic effect in the eye of the wearer. In some cases, Leachable Material may also bloom to the surface of a contact lens where it may form a hydrophobic surface and may attract debris from tears, or may interfere with wetting of the lens.

Some material may be physically trapped in the polymer matrix and may not be able to be removed for example by extracting with water or an organic solvent. As used herein, trapped material is not considered Leachable Material.

Leachable material typically includes most or all of the material included in the monomer mix that does not have polymerizable functionality. For example, a diluent may be a Leachable Material. Leachable material may also include nonpolymerizable impurities which were present in the monomer. As polymerization approaches completion, the rate of polymerization will typically slow and some small amount of the monomer may never polymerize. Monomer that never polymerizes can be included in the material that will be leached from the polymerized lens. Leachable material may also include small polymer fragments, or oligomers. Oligomers can result from the termination reactions early in the formation of any given polymer chain. Accordingly, Leachable Materials can include any or all of a mixture of the above described components, which may vary one to another in their properties such as toxicity, molecular weight or water solubility.

Leach Aids

According to the present invention, leaching of a silicone hydrogel lens is facilitated by exposing the lens to a solution including one or more leaching aids combined with water at concentrations effective to remove UCDs from the lens.

For example, in some embodiments, ophthalmic lenses can be subjected to a treatment exposing the lenses to a leach aid and a GC Mass Spectrometer can be used to measure the level of one or more UCDs in the ophthalmic lenses. The GC Mass Spectrometer can determine whether treatment with a particular leaching aid is effective to reduce an amount of particular UCDs present in the lenses to a maximum threshold amount.

Accordingly, in some embodiments, a GC Mass Spectrometer can be used to check for a maximum threshold of UCDs, such as SiMMA, mPDMS, SiMMA glycol, and epoxide, of approximately 300 ppm. A minimum hydration treatment time period necessary to reduce the presence of such UCDs to 300 ppm or less in specific lenses can be determined by the periodic measurements. In additional embodiments, other UCDs, such as, for example, D3O or other diluents, can be measured to detect the presence of a maximum amount of approximately 60 ppm. Embodiments can also include setting a threshold amount of a particular UCD at the minimum detection level ascertainable by the testing equipment.

Examples of leaching aids, according to the present invention include: ethoxylated alcohols or ethoxylated carboxylic acids, ethoxylated glucosides or sugars, optionally with attached C8 to C14 carbon chains, polyalkylene oxides, sulfates, carboxylates or amine oxides of C8-C10 compounds. Examples include cocoamidopropylamine oxide, $C_{12-14}$ fatty alcohol ethoxylated with 10 ethylene oxides, sodium dodecyl sulfate, polyoxyethylene-2-ethyl hexyl ether, polypropylene glycol, polyethylene glycol monomethyl ether, ethoxylated methyl glucoside dioleate, and the sodium salt of n-octylsulfate, sodium salt of ethylhexyl sulfate.

In order to illustrate the invention the following examples are included. These examples do not limit the invention. They are meant only to suggest a method of practicing the invention. Those knowledgeable in contact lenses, as well as other arts, may find other methods of practicing the invention, those methods are deemed to be within the scope of this invention.

High Molecular Weight Hydrophilic Polymer

As used herein, "high molecular weight hydrophilic polymer" refers to substances having a weight average molecular weight of no less than about 100,000 Daltons, wherein said substances upon incorporation to silicone hydrogel formulations, increase the wettability of the cured silicone hydrogels. The preferred weight average molecular weight of these high molecular weight hydrophilic polymers is greater than about 150,000; more preferably between about 150,000 to about 2,000,000 Daltons, more preferably still between about 300,000 to about 1,800,000 Daltons, most preferably about 500,000 to about 1,500,000 Daltons.

Alternatively, the molecular weight of hydrophilic polymers of the invention can be also expressed by the K-value, based on kinematic viscosity measurements, as described in Encyclopedia of Polymer Science and Engineering, N-Vinyl Amide Polymers, Second edition, Vol 17, pgs. 198-257, John Wiley & Sons Inc. When expressed in this manner, hydrophilic monomers having K-values of greater than about 46 and preferably between about 46 and about 150. The high molecular weight hydrophilic polymers are present in the formulations of these devices in an amount sufficient to provide contact lenses, which without surface modification remain substantially free from surface depositions during use. Typical use periods include at least about 8 hours, and preferably worn several days in a row, and more preferably for 24 hours or more without removal. Substantially free from surface deposition means that, when viewed with a slit lamp, at least about 70% and preferably at least about 80%, and more preferably about 90% of the lenses worn in the patient population display depositions rated as none or slight, over the wear period.

Suitable amounts of high molecular weight hydrophilic polymer include from about 1 to about 15 weight percent, more preferably about 3 to about 15 percent, most preferably about 5 to about 12 percent, all based upon the total of all reactive components.

Examples of high molecular weight hydrophilic polymers include but are not limited to polyamides, polylactones, polyimides, polylactams and functionalized polyamides, polylactones, polyimides, polylactams, such as DMA functionalized by copolymerizing DMA with a lesser molar amount of a hydroxyl-functional monomer such as HEMA, and then reacting the hydroxyl groups of the resulting copolymer with materials containing radical polymerizable groups, such as isocyanatoethylmethacrylate or methacryloyl chloride. Hydrophilic prepolymers made from DMA or n-vinyl pyrrolidone with glycidyl methacrylate may also be used. The glycidyl methacrylate ring can be opened to give a diol which may be used in conjunction with other hydrophilic prepolymer in a mixed system to increase the compatibility of the high molecular weight hydrophilic polymer, hydroxyl-functionalized silicone containing monomer and any other groups which impart compatibility. The preferred high molecular weight hydrophilic polymers are those that contain a cyclic moiety in their backbone, more preferably, a cyclic amide or cyclic imide. High molecular weight hydrophilic polymers include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl4,5-dimethyl-2-pyrrol-idone, polyvinylimidazole, poly-N-N-dimethylacrylamide, polyvinyl alcohol, polyacrylic acid, polyethylene oxide, poly 2 ethyl oxazoline, heparin polysaccharides, polysaccharides, mixtures and copolymers (including block or random, branched, multichain, comb-shaped or star shaped) thereof where poly-N-vinylpyrrolidone (PVP) is particularly preferred. Copolymers might also be used such as graft copolymers of PVP.

The high molecular weight hydrophilic polymers provide improved wettability, and particularly improved in vivo wettability to the medical devices of the present invention. Without being bound by any theory, it is believed that the high molecular weight hydrophilic polymers are hydrogen bond receivers which in aqueous environments, hydrogen bond to water, thus becoming effectively more hydrophilic. The absence of water facilitates the incorporation of the hydrophilic polymer in the reaction mixture. Aside from the specifically named high molecular weight hydrophilic polymers, it is expected that any high molecular weight polymer will be useful in this invention provided that when said polymer is added to a silicone hydrogel formulation, the hydrophilic polymer (a) does not substantially phase separate from the reaction mixture and (b) imparts wettability to the resulting cured polymer. In some embodiments it is preferred that the high molecular weight hydrophilic polymer be soluble in the diluent at processing temperatures. Manufacturing processes which use water or water soluble diluents may be preferred due to their simplicity and reduced cost. In these embodiments high molecular weight hydrophilic polymers which are water soluble at processing temperatures are preferred.

Hydroxyl-Functionalized Silicone Containing Monomer

As used herein a "hydroxyl-functionalized silicone containing monomer" is a compound containing at least one polymerizable group having an average molecular weight of about less than 5000 Daltons as measured via gel permeation chromatography, refractive index detection, and preferably less than about 3000 Daltons, which is capable of compatibilizing the silicone containing monomers included in the hydrogel formulation with the hydrophilic polymer. Hydroxyl functionality is very efficient at improving hydrophilic compatibility. Thus, in a preferred embodiment hydroxyl-functionalized silicone containing monomers of the present invention comprise at least one hydroxyl group and at least one "—Si—O—Si—" group. It is preferred that silicone and its attached oxygen account for more than about 10 weight percent of said hydroxyl-functionalized silicone containing monomer, more preferably more than about 20 weight percent.

The ratio of Si to OH in the hydroxyl-functionalized silicone containing monomer is also important to providing a hydroxyl functionalized silicone containing monomer which will provide the desired degree of compatibilization. If the ratio of hydrophobic portion to OH is too high, the hydroxyl-functionalized silicone monomer may be poor at compatibilizing the hydrophilic polymer, resulting in incompatible reaction mixtures. Accordingly, in some embodiments, the Si to OH ratio is less than about 15:1, and preferably between about 1:1 to about 10:1. In some embodiments primary alcohols have provided improved compatibility compared to secondary alcohols. Those of skill in the art will appreciate that the amount and selection of hydroxyl-functionalized silicone containing monomer will depend on how much hydrophilic polymer is needed to achieve the desired wettability and the degree to which the silicone containing monomer is incompatible with the hydrophilic polymer.

In some embodiments, reaction mixtures of the present invention may include more than one hydroxyl-functionalized silicone containing monomer. For monofunctional hydroxyl functionalized silicone containing monomer the preferred R' is hydrogen, and the preferred $R^2$, $R^3$, and $R^4$, are $C^{1-6}$alkyl and tri$C^{1-6}$alkylsiloxy, most preferred methyl and trimethylsiloxy. For multifunctional (difunctional or higher) $R^1$-$R^4$ independently comprise ethylenically unsaturated polymerizable groups and more preferably comprise an acrylate, a styryl, a $C_{1-6}$alkylacrylate, acrylamide, $C_{1-6}$alkylacrylamide, N-vinyllactam, N-vinylamide, $C_{2-12}$alkenyl, $C_{2-12}$alkenylphenyl, $C_{2-12}$alkenylnaphthyl, or $C_{2-6}$alkenylphenyl $C_{1-6}$alkyl. In some embodiments $R^5$ is hydroxyl, —$CH_2OH$ or $CH_2CHOHCH_2OH$.

In some other embodiments, $R^6$ is a divalent $C_{1-6}$alkyl, $C_{1-6}$alkyloxy, $C_{1-6}$alkyloxy$C_{1-6}$alkyl, phenylene, naphthalene, $C_{1-12}$ cycloalkyl, $C_{1-6}$alkoxycarbonyl, amide, carboxy, $C_{1-6}$ alkylcarbonyl, carbonyl, $C_{1-6}$alkoxy, substituted $C_{1-6}$alkyl, substituted $C_{1-6}$alkyloxy, substituted $C_{1-6}$alkyloxy$C_{1-6}$alkyl, substituted phenylene, substituted naphthalene, substituted $C_{1-12}$cycloalkyl, where the substituents are selected from one or more members of the group consisting of $C_{1-6}$ alkoxycarbonyl, $C_{1-6}$alkyl, $C_{1-6}$alkoxy, amide, halogen, hydroxyl, carboxyl, $C_{1-6}$alkylcarbonyl and formyl. The particularly preferred $R^6$ is a divalent methyl(methylene).

In some embodiments, $R^7$ comprises a free radical reactive group, such as an acrylate, a styryl, vinyl, vinyl ether, itaconate group, a $C_{1-6}$alkylacrylate, acrylamide, $C_{1-6}$alkylacrylamide, N-vinyllactam, N-vinylamide, $C_{2-12}$alkenyl, $C_{2-12}$alkenylphenyl-, $C_{2-12}$alkenylnaphthyl, or $C_{2-6}$alkenylphenyl$C_{1-6}$alkyl or a cationic reactive group such as vinyl ether or epoxide groups. The particularly preferred $R^7$ is methacrylate.

In some embodiments, $R^8$ is a divalent $C_{1-6}$alkyl, $C_{1-6}$alkyloxy, $C^{1-6}$alkyloxy$C_{1-6}$alkyl, phenylene, naphthalene, $C_{1-12}$cycloalkyl, $C_{1-6}$alkoxycarbonyl, amide, carboxy, $C_{1-6}$alkylcarbonyl, carbonyl, $C_{1-6}$alkoxy, substituted $C_{1-6}$alkyl, substituted $C_{1-6}$alkyloxy, substituted $C_{1-6}$alkyloxy$C_{1-6}$alkyl, substituted phenylene, substituted naphthalene, substituted $C_{1-12}$cycloalkyl, where the substituents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl. The particularly preferred $R^8$ is $C_{1-6}$alkyloxy$C_{1-6}$alkyl.

Examples of hydroxyl-functionalized silicone containing monomer of Formula I include 2-propenoic acid, 2-methyl-, 2-hydroxy-3-[3-[1,3,3,3-tetramethyl-1-[(trimethylsilyl)oxy]disi-loxanyl]propoxy]propyl ester (which can also be named (3-methacryloxy-2-hydroxypropyloxy)propylbis(trimethylsiloxy)methylsilane-)2. The compound, (3-methacryloxy-2-hydroxypropyloxy)propylbis(trimethylsiloxy)methylsilane can be formed from an epoxide, which produces an 80:20 mixture of the compound shown above and (2-methacryloxy-3-hydroxypropyloxy)propylbis(trimethylsiloxy)methylsilane. In some embodiments of the present invention it is preferred to have some amount of the primary hydroxyl present, preferably greater than about 10 wt % and more preferably at least about 20 wt %.

Other suitable hydroxyl-functionalized silicone containing monomers include (3-methacryloxy-2-hydroxypropyloxy)propyltris(trimethylsiloxy)sil-ane 3 bis-3-methacryloxy-2-hydroxypropyloxypropyl polydimethylsiloxane 4 3-methacryloxy-2-(2-hydroxyethoxy)propyloxy)propylbis(trimethylsilo-xy)methylsilane 5 N,N,N',N'-tetrakis(3-methacryloxy-2-hydroxypropyl)-.alpha.,.omega.-bis-3-aminopropyl-polydimethylsiloxane.

The reaction products of glycidyl methacrylate with amino-functional polydimethylsiloxanes may also be used as a hydroxyl-functional silicone containing monomer. Still additional structures which may be suitable hydroxyl-functionalized silicone containing monomers include those similar to compounds having the following structure: 6 where n=1-50 and R independently comprise H or a polymerizable unsaturated group, with at least one R comprising a polymerizable group, and at least one R, and preferably 3-8 R, comprising H. These components may be removed from the hydroxyl-functionalized monomer via known methods such as liquid phase chromatography, distillation, recrystallization or extraction, or their formation may be avoided by careful selection of reaction conditions and reactant ratios.

Suitable monofunctional hydroxyl-functionalized silicone monomers are commercially available from Gelest, Inc. Morrisville, Pa. Suitable multifunctional hydroxyl-functionalized silicone monomers are commercially available from Gelest, Inc, Morrisville, Pa. or may be made using known procedures.

While hydroxyl-functionalized silicone containing monomers have been found to be particularly suitable for providing compatible polymers for biomedical devices, and particularly ophthalmic devices, any functionalized silicone containing monomer which, when polymerized and/or formed into a final article is compatible with the selected hydrophilic components may be used. Suitable functionalized silicone containing monomers may be selected using the following monomer compatibility test. In this test one gram of each of mono-3-methacryloxypropyl terminated, mono-butyl terminated polydimethylsiloxane (mPDMS MW 800-1000) and a monomer to be tested are mixed together in one gram of 3,7-dimethyl-3-octanol at about 20.degree. C. A mixture of 12 weight parts K-90 PVP and 60 weight parts DMA is added drop-wise to hydrophobic component solution, with stirring, until the solution remains cloudy after three minutes of stirring. The mass of the added blend of PVP and DMA is determined in grams and recorded as the monomer compatibility index. Any hydroxyl-functionalized silicone-containing monomer having a compatibility index of greater than 0.2 grams, more preferably greater than about 0.7 grams and most preferably greater than about 1.5 grams will be suitable for use in this invention.

An "effective amount" or a "compatibilizing effective amount" of the hydroxyl-functionalized silicone-containing monomers of the invention is the amount needed to compatibilize or dissolve the high molecular weight hydrophilic polymer and the other components of the polymer formulation. Thus, the amount of hydroxyl-functional silicone containing monomer will depend in part on the amount of hydrophilic polymer which is used, with more hydroxyl-functionalized silicone containing monomer being needed to compatibilize higher concentrations of hydrophilic polymer. Effective amounts of hydroxyl-functionalized silicone containing monomer in the polymer formulation include about 5% (weight percent, based on the weight percentage of the reactive components) to about 90%, preferably about 10% to about 80%, most preferably, about 20% to about 50%.

In addition to the high molecular weight hydrophilic polymers and the hydroxyl-functionalized silicone containing monomers of the invention other hydrophilic and hydrophobic monomers, crosslinkers, additives, diluents, polymerization initiators may be used to prepare the biomedical devices of the invention. In addition to high molecular weight hydrophilic polymer and hydroxyl-functionalized silicone containing monomer, the hydrogel formulations may include additional silicone containing monomers, hydrophilic monomers, and cross linkers to give the biomedical devices of the invention.

Additional Silicone Containing Monomers

With respect to the additional silicone containing monomers, useful amide analogs of TRIS can include, 3-methacryloxypropyltris(trimethylsiloxy)silane (TRIS), monomethacryloxypropyl terminated polydimethylsiloxanes, polydimethylsiloxanes, 3-methacryloxypropylbis(trimethylsiloxy)methylsila-ne, methacryloxypropylpentamethyl disiloxane and combinations thereof are particularly useful as additional silicone-containing monomers of the invention. Additional silicone containing monomers may be present in amounts of about 0 to about 75 wt %, more preferably of about 5 and about 60 and most preferably of about 10 and 40 weight %.

Hydrophilic Monomers

Additionally, reaction components of the present invention may also include any hydrophilic monomers used to prepare conventional hydrogels. For example monomers containing acrylic groups ($CH_2$=CRCOX, where R is hydrogen or $C_{1-6}$alkyl an X is O or N) or vinyl groups (—C=$CH_2$) may be used. Examples of additional hydrophilic monomers are N,N-dimethylacrylamide, 2-hydroxyethyl methacrylate, glycerol monomethacrylate, 2-hydroxyethyl methacrylamide, polyethyleneglycol monomethacrylate, methacrylic acid, acrylic acid, N-vinyl pyrrolidone, N-vinyl-N-methyl acetamide, N-vinyl-N-ethyl acetamide, N-vinyl-N-ethyl formamide, N-vinyl formamide and combinations thereof.

Aside the additional hydrophilic monomers mentioned above, polyoxyethylene polyols having one or more of the terminal hydroxyl groups replaced with a functional group containing a polymerizable double bond may be used. Examples include polyethylene glycol, ethoxylated alkyl glucoside and ethoxylated bisphenol A, reacted with one or more molar equivalents of an end-capping group such as isocyanatoethyl methacrylate, methacrylic anhydride, methacryloyl chloride, vinylbenzoyl chloride, and the like, produce a polyethylene polyol having one or more terminal polymerizable olefinic groups bonded to the polyethylene polyol through linking moieties such as carbamate, urea or ester groups.

Still further examples include the hydrophilic vinyl carbonate or vinyl carbamate monomers, hydrophilic oxazolone monomers and polydextran.

Additional hydrophilic monomers can include N,N-dimethylacrylamide (DMA), 2-hydroxyethyl methacrylate (HEMA), glycerol methacrylate, 2-hydroxyethyl methacrylamide, N-vinylpyrrolidone (NVP), polyethyleneglycol monomethacrylate, methacrylic acid, acrylic acid and combinations thereof. Additional hydrophilic monomers may be present in amounts of about 0 to about 70 wt %, more preferably of about 5 and about 60 and most preferably of about 10 and 50 weight %.

Crosslinkers

Suitable crosslinkers are compounds with two or more polymerizable functional groups. The crosslinker may be hydrophilic or hydrophobic and in some embodiments of the present invention mixtures of hydrophilic and hydrophobic crosslinkers have been found to provide silicone hydrogels with improved optical clarity (reduced haziness compared to a CSI Thin Lens). Examples of suitable hydrophilic crosslinkers include compounds having two or more polymerizable functional groups, as well as hydrophilic functional groups such as polyether, amide or hydroxyl groups. Specific examples include TEGDMA (tetraethyleneglycol dimethacrylate), TrEGDMA (triethyleneglycol dimethacrylate), ethyleneglycol dimethacrylate (EGDMA), ethylenediamine dimethyacrylamide, glycerol dimethacrylate and combinations thereof Examples of suitable hydrophobic crosslinkers include multifunctional hydroxyl-functionalized silicone containing monomer, multifunctional polyether-polydimethylsiloxa-ne block copolymers, combinations thereof and the like. Specific hydrophobic crosslinkers include acryloxypropyl terminated polydimethylsiloxane (n=10 or 20) (acPDMS), hydroxylacrylate functionalized siloxane macromer, methacryloxypropyl terminated PDMS, butanediol dimethacrylate, divinyl benzene, 1,3-bis(3-methacryloxypropyl)-tetrakis(trimethylsiloxy)disiloxane and mixtures thereof. Preferred crosslinkers include TEGDMA, EGDMA, acPDMS and combinations thereof. The amount of hydrophilic crosslinker used is generally about 0 to about 2 weight % and preferably from about 0.5 to about 2 weight % and the amount of hydrophobic crosslinker is about 0 to about 5 weight %, which can alternatively be referred to in mol % of about 0.01 to about 0.2 mmole/gm reactive components, preferably about 0.02 to about 0.1 and more preferably 0.03 to about 0.6 mmole/gm.

Increasing the level of crosslinker in the final polymer has been found to reduce the amount of haze. However, as crosslinker concentration increases above about 0.15 mmole/gm reactive components modulus may increase above generally desired levels (greater than about 90 psi). Thus, in some embodiments of the present invention the crosslinker composition and amount is selected to provide a crosslinker concentration in the reaction mixture of between about 0.01 and about 0.1 mmoles/gm crosslinker.

Additional components or additives, which are generally known in the art may also be included. Additives include but are not limited to ultra-violet absorbing compounds and monomer, reactive tints, antimicrobial compounds, pigments, photochromic, release agents, combinations thereof and the like.

Additional components include other oxygen permeable components such as carbon-carbon triple bond containing monomers and fluorine containing monomers which are known in the art and include fluorine-containing (meth)acrylates, and more specifically include, for example, fluorine-containing $C_2$-$C_{12}$ alkyl esters of (meth)acrylic acid such as 2,2,2-trifluoroethyl(meth)acrylate, 2,2,2,2',2',2'-hexafluoroisopropyl(meth)acrylate, 2,2,3,3,4,4,4-heptafluorobutyl (meth)acrylate, 2,2,3,3,4,4,5,5,6,6,7,7,8,-8,8-pentadecafluorooctyl(meth)acrylate, 2,2,3,3,4,4,5,5,6,6,7,7,8,8,9,9-hexadecafluorononyl(meth)acrylate and the like Diluents The reaction components (hydroxyl-functionalized silicone containing monomer, hydrophilic polymer, crosslinker(s) and other components) are generally mixed and reacted in the absence of water and optionally, in the presence of at least one diluent to form a reaction mixture. The type and amount of diluent used also effects the properties of the resultant polymer and article. The haze and wettability of the final article may be improved by selecting relatively hydrophobic diluents and/or decreasing the concentration of diluent used. As discussed above, increasing the hydrophobicity of the diluent may also allow poorly compatible components (as measured by the compatibility test) to be processed to form a compatible polymer and article. However, as the diluent becomes more hydrophobic, processing steps necessary to replace the diluent with water will require the use of solvents other than water. This may undesirably increase the complexity and cost of the manufacturing process. Thus, it is important to select a diluent which provides the desired compatibility to the components with the necessary level of processing convenience. Diluents useful in preparing the devices of this invention include ethers, esters, alkanes, alkyl halides, silanes, amides, alcohols and combinations thereof. Amides and alcohols are preferred diluents, and secondary and tertiary alcohols are most preferred alcohol diluents. Examples of ethers useful as diluents for this invention include tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols and mixtures thereof. Examples of esters useful for this invention include ethyl acetate, butyl acetate, amyl acetate, methyl lactate, ethyl lactate, i-propyl lactate. Examples of alkyl halides useful as diluents for this invention include methylene chloride. Examples of silanes useful as diluents for this invention include octamethylcyclotetrasiloxane.

Examples of alcohols useful as diluents for this invention include those having the formula 7 wherein R, R' and R" are independently selected from H, a linear, branched or cyclic monovalent alkyl having 1 to 10 carbons which may optionally be substituted with one or more groups including halogens, ethers, esters, aryls, amines, amides, alkenes, alkynes, carboxylic acids, alcohols, aldehydes, ketones or the like, or any two or all three of R, R and R" can together bond to form one or more cyclic structures, such as alkyl having 1 to 10 carbons which may also be substituted as just described, with the proviso that no more than one of R, R' or R' is H.

It is preferred that R, R' and R" are independently selected from H or unsubstituted linear, branched or cyclic alkyl groups having 1 to 7 carbons. It is more preferred that R, R', and R" are independently selected form unsubstituted linear, branched or cyclic alkyl groups having 1 to 7 carbons. In certain embodiments, the preferred diluent has 4 or more, more preferably 5 or more total carbons, because the higher molecular weight diluents have lower volatility, and lower flammability. When one of the R, R' and R" is H, the structure forms a secondary alcohol. When none of the R, R' and R" are H, the structure forms a tertiary alcohol. Tertiary alcohols are more preferred than secondary alcohols. The diluents are preferably inert and easily displaceable by water when the total number of carbons is five or less. Examples of useful secondary alcohols include 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, and the like.

Examples of useful tertiary alcohols include tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, and the like.

A single alcohol or mixtures of two or more of the above-listed alcohols or two or more alcohols according to the structure above can be used as the diluent to make the polymer of this invention.

In certain embodiments, the preferred alcohol diluents are secondary and tertiary alcohols having at least 4 carbons. In particular, some alcohol diluents can include tert-butanol, tert-amyl alcohol, 2-butanol, 2-methyl-2-pentanol, 2,3-dimethyl-2-butanol, 3-methyl-3-pentanol, 3-ethyl-3-pentanol, 3,7-dimethyl-3-octanol.

Diluents can also include: hexanol, heptanol, octanol, nonanol, decanol, tert-butyl alcohol, 3-methyl-3-pentanol, isopropanol, t amyl alcohol, ethyl lactate, methyl lactate, i-propyl lactate, 3,7-dimethyl-3-octanol, dimethyl formamide, dimethyl acetamide, dimethyl propionamide, N methyl pyrrolidinone and mixtures thereof.

In some embodiments of the present invention the diluent is water soluble at processing conditions and readily washed out of the lens with water in a short period of time. Suitable water soluble diluents include 1-ethoxy-2-propanol, 1-methyl-2-propanol, t-amyl alcohol, tripropylene glycol methyl ether, isopropanol, 1-methyl-2-pyrrolidone, N,N-dimethylpropionamide, ethyl lactate, dipropylene glycol methyl ether, mixtures thereof and the like. The use of a water soluble diluent allows the post molding process to be conducted using water only or aqueous solutions which comprise water as a substantial component.

In some embodiments, the amount of diluent can be generally less than about 50 weight % of the reaction mixture and preferably less than about 40% and more preferably between about 10 and about 30%. In some embodiments, diluent may also include additional components such as release agents and can include water soluble and aid in lens deblocking.

Polymerization initiators can include, for example, compounds such as: lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acyl phosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-o-ne, bis(2,6-dimethoxybenzoyl)-2,4-4-trimethylpentyl phosphine oxide (DMBAPO), bis(2,4,6-trimethylbenzoyl)-phenylphosphineoxide (Irgacure 819), 2,4,6-trimethylbenzyldiphenyl phosphine oxide and 2,4,6-trimethylbenzyoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, some embodiments can include a combination of 1-hydroxycyclohexyl phenyl ketone and bis(2,6-dimethoxybenzoyl)-2,4-4-trimethylpentyl phosphine oxide (DMBAPO), and the method of polymerization initiation can include visible light. Other embodiments can include: bis(2,4,6-trimethylbenzoyl)-phenylphosphineoxide (Irgacure 819®).

In some embodiments, the present invention can further include ophthalmic lenses of the formulae: 1 Wt % components HFSCM HMWHP SCM HM 5-90 1-15, 3-15 or 5-12 0 0 10-80 1-15, 3-15 or 5-12 0 0 20-50 1-15, 3-15 or 5-12 0 0 5-90, 1-15, 3-15 or 5-12 0-80, 5-60 or 10-0-70, 5-60 or 10-40 50 10-80 1-15, 3-15 or 5-12 0-80, 5-60 or 10-0-70, 5-60 or 10-40 50 20-50 1-15, 3-15 or 5-12 0-80, 5-60 or 10-0-70, 5-60 or 10-40 50 HFSCM is hydroxyl-functionalized silicone containing monomer HMWHP is high molecular weight hydrophilic polymer SCM is silicone containing monomer HM is hydrophilic monomer.

The weight percents above can be based upon all reactive components. Thus, in some embodiments, the present invention can include one or more of: silicone hydrogels, biomedical devices, ophthalmic devices and contact lenses, each of one or more of the compositions listed in the table, which describes ninety possible compositional ranges. Each of the ranges considered can be prefixed with "about", whereby the range combinations presented with the proviso that the listed components, and any additional components add up to 100 weight %.

A range of the combined silicone-containing monomers (hydroxyl-functionalized silicone-containing and additional silicone-containing monomers) can be from about 5 to 99 weight percent, more preferably about 15 to 90 weight percent, and in some embodiments about 25 to about 80 weight percent of the reaction components. A range of hydroxyl-functionalized silicone-containing monomer can be about 5 to about 90 weight percent, preferably about 10 to about 80, and most preferably about 20 to about 50 weight percent. In some embodiments a range of hydrophilic monomer can be from about 0 to about 70 weight percent, more preferably about 5 to about 60 weight percent, and most preferably about 10 to about 50 weight percent of the reactive components. In other embodiments a range of high molecular weight hydrophilic polymer can be about 1 to about 15 weight percent, or about 3 to about 15 weight percent, or about 5 to about 12 weight percent. All of the about weight percents are based upon the total of all reactive components.

In some embodiments, a range of diluent is from about 0 to about 70 weight percent, or about 0 to about 50 weight percent, and or about 0 to about 40 weight percent and in some embodiments, between about 10 and about 30 weight percent, based upon the weight all component in the reactive mixture. The amount of diluent required varies depending on the nature and relative amounts of the reactive components.

In some embodiments, the reactive components comprise 2-propenoic acid, 2-methyl-,2-hydroxy-3-[3-[1,3,3,3-tetramethyl-1-[(trime-thylsilyl)oxy]disiloxanyl]propoxy]propyl ester "SiGMA" .about.28 wgt. % of the reaction components); (800-1000 MW monomethacryloxypropyl terminated mono-n-butyl terminated polydimethylsiloxane, "mPDMS" (.about.31% wt); N,N-dimethylacrylamide, "DMA" (.about.24% wt); 2-hydroxyethyl methacryate, "HEMA" (.about.6% wt); tetraethyleneglycoldimethacrylate, "TEGDMA" (.about.1.5% wt), polyvinylpyrrolidone, "K-90 PVP" (.about.7% wt); with the balance comprising minor amounts of additives and photoinitiators. The polymerization can also be conducted in the presence of about 23% (weight % of the combined monomers and diluent blend) 3,7-dimethyl-3-octanol diluent.

In some embodiments, the polymerizations for the above formulations can be conducted in the presence of tert-amyl-alcohol as a diluent comprising about 29 weight percent of the uncured reaction mixture.

Processing

Embodiments can include ophthalmic lenses of the present invention which are prepared by mixing the high molecular weight hydrophilic polymer, the hydroxyl-functionalized silicone-containing monomer, plus one or more of the following: the additional silicone containing monomers, the hydrophilic monomers, the additives ("Reactive Components"), and the diluents (collectively, the "Reaction Mixture"), with a polymerization initiator and curing the Reaction Mixture by appropriate conditions to form a product that can be subsequently formed into a predefined shape by lathing, cutting and the like. Alternatively, the reaction mixture may be placed in a mold and subsequently cured into an appropriate article.

Various processes are known for processing the reaction mixture in the production of contact lenses, including spin-casting and static casting. In some embodiments, the method for producing contact lenses of the polymer of this invention is by the molding of the silicone hydrogels. During molding, the Reaction Mixture is placed in a mold having the shape of the final desired silicone hydrogel, i.e., water-swollen polymer, and the reaction mixture is subjected to conditions whereby the monomers polymerize, to thereby produce a polymer/diluent mixture in the shape of the final desired product. Then, this polymer/diluent mixture is treated with a solution to remove the diluent and ultimately replace it with water, producing a silicone hydrogel having a final size and shape which are quite similar to the size and shape of the original molded polymer/diluent article.

Curing

Another aspect of some embodiments of the present invention includes curing silicone hydrogel formulations in a manner that provides enhanced wettability. According to the present invention, it has been found that gel time for a silicone hydrogel may be correlated with cure conditions to provide a wettable ophthalmic device, and specifically a contact lens. As used herein, the gel time is the time at which a cross linked polymer network is formed, resulting in the viscosity of the curing reaction mixture approaching infinity and the reaction mixture becoming non-fluid. The gel point occurs at a specific degree of conversion, independent of reaction conditions, and therefore can be used as an indicator of the rate of the reaction. It has been found that, for a given reaction mixture, the gel time may be used to determine cure conditions which impart desirable wettability. Thus, in some embodiments of the present invention, the reaction mixture can be cured at or above a gel time that provides improved wettability, an din some embodiments of sufficient wettability for the resulting device to be used without a hydrophilic coating or surface treatment ("minimum gel time"). In some embodiments, improved wettability can be a decrease in advancing dynamic contact angle of at least 10% compared to formulation with no high molecular weight polymer. In some embodiments, therefore, longer gel times are preferred as they provide improved wettability and increased processing flexibility.

Gel times may vary for different silicone hydrogel formulations. Cure conditions can also effect gel time. For example, in some embodiments, the concentration of crosslinker will impact gel time, wherein increasing crosslinker concentrations decreases gel time. Increasing the intensity of the radiation (for photopolymerization) or temperature (for thermal polymerization), the efficiency of initiation (either by selecting a more efficient initiator or irradiation source, or an initiator which absorbs more strongly in the selected irradiation range) will also decrease gel time. Temperature and diluent type and concentration can also effect gel time in ways understood by those of skill in the art.

In some embodiments, a minimum gel time may be determined by selecting a given formulation, varying one of the above factors and measuring the gel time and contact angles. The minimum gel time can therefore be the point above which the resulting lens is generally wettable. Below the minimum gel time, the lens may not wettable. In the context of this description, for a contact lens, "generally wettable" is a lens which displays an advancing dynamic contact angle of less than about 80 degrees, an in some embodiments less than 70 degrees and in still other embodiments less than about 60 degrees. Thus, those of skill in the art will appreciate that minimum gel point as defined herein may be a range, taking into consideration statistical experimental variability.

In certain embodiments, using visible light irradiation minimum gel times of at least about 30 seconds have been found to be advantageous.

In some embodiments, a mold containing the Reaction Mixture is exposed to ionizing or actinic radiation, for example electron beams, Xrays, UV or visible light, i.e. electromagnetic radiation or particle radiation having a wavelength in the range of from about 150 to about 800 nm. In some embodiments, the radiation source is UV or visible light having a wavelength of about 250 to about 700 nm. Suitable radiation sources can include UV lamps, fluorescent lamps, incandescent lamps, mercury vapor lamps, and sunlight. In embodiments where a UV absorbing compound is included in the composition (for example, as a UV block) curing is conducting by means other than UV irradiation (such as by visible light or heat). In some preferred embodiments the radiation source can be selected from UVA (about 315-about 400 nm), UVB (about 280-about 315) or visible light (about 400-about 450 nm), at low intensity.

In other embodiments, the reaction mixture includes a UV absorbing compound, is cured using visible light and low intensity. As used herein the term "low intensity" means those between about 0.1 mW/cm$^2$ to about 6 mW/cm$^2$ and preferably between about 0.2 mW/cm$^2$ and 3 mW/cm$^2$. The cure time can therefore be relatively long, generally more than about 1 minute and preferably between about 1 and about 60 minutes and still more preferably between about 1 and about 30 minutes. In some embodiments, relatively slow, low intensity cure can provide compatible ophthalmic devices which display lasting resistance to protein deposition in vivo.

In some embodiments, the temperature at which the reaction mixture is cured can be increased to above ambient, wherein the haze of the resulting polymer decreases. Temperatures effective to reduce haze include temperatures at which the haze for the resulting lens is decreased by at least about 20% as compared to a lens of the same composition made at 25 degrees C. Thus, in some embodiments, suitable cure temperatures can include temperatures greater than about 25 degrees C. Specifically embodiments can include ranges of between about 25 degrees C. and 70 degrees C. and between about 40 degrees C. and 70 degrees C. The precise set of cure conditions (temperature, intensity and time) may depend upon the components of lens material selected and, with reference to the teaching herein, are within the skill of one of ordinary skill in the art to determine. Cure may be conducted in one or a multiplicity of cure zones, and should preferably be sufficient to form a polymer network from the reaction mixture. Typically, the resulting polymer network can be swollen with the diluent and has the form of the mold cavity.

Although the present invention has been described from the aspect of one or more processes, it is to be understood that the present invention also incorporates apparatus and systems, such as, by way of non-limiting example: mold handling machinery, hydration towers, immersion tanks, automated control systems, monomer dispensers, curing tunnels, heat exchangers, and the like, which may be used to implement one or more of the steps described herein.

EXAMPLES

Lenses made according to the description above (except with 24 parts N,N-dimethylacrylamide and 0.48 ppm CGI 1850) using concave mold parts combined with convex mold parts.

After photocuring, the convex mold halves were removed, and the lens in the concave mold halves were placed into 10 different stirring aqueous solutions, each solution including one or more agents, as indicated in Table 1.

The lenses were stirred in solution for a total time as also indicated in Table 1, then removed and extracted with acetonitrile to remove residual D3O diluent. The acetonitrile extract was analyzed for D3O by GC, and the results are shown in Table 1 as a percentage of the level found in unleached control lenses.

TABLE 1

| Test | Agent 1 | Agent 2 SCAW | Agent 3 CTSB | Temp. | ml/lens | Residual D3O | Leach time (min.) |
|---|---|---|---|---|---|---|---|
| 1 | 5% C12E10 | 5% | | 55° C. | 35 | 11% | 60 |
| 2 | 5% SDS | 5% | | 55° C. | 35 | 12% | 60 |
| 3 | 5% EH-5 | 5% | | 55° C. | 35 | 14% | 60 |
| 4 | 5% PPG 425 | 5% | | 55° C. | 35 | 17% | 60 |
| 5 | 5% C12E10 | | | 55° C. | 35 | 19% | 60 |
| 6 | 5% EtOH | 5% | | 55° C. | 35 | 20% | 60 |
| 7 | 5% IPA | 5% | 5% | 55° C. | 35 | 20% | 150 |
| 8 | 1% CTSB | | | 65° C. | 35 | 42% | 60 |
| 9 | 1% DOE-120 | | | 90° C. | 35 | 46% | 60 |
| 10 | 1% TAA | | | 23° C. | 35 | 50% | 120 |
| Comp. | | | | 90° C. | 35 | 100% | na | wherein "SCAW" refers to a blend comprising water, cocoamidopropylamine oxide and glycerin, and is sometimes referred to as Standamox CAW: "C12E10" refers to $C_{12-14}$ fatty alcohol ethoxylated with 10 ethylene oxides: "IPA" "refers to isopropyl alcohol: "EtOH"" refers to ethanol: "PPG" v polypropylene glycol: EH-5 "refers to Polyoxyethylene-2-ethyl hexyl ether; and "SDS"" refers to sodium dodecyl sulfate.

What is claimed:

1. A method for removing unreacted components and diluents from an ophthalmic lens comprising silicone, the method comprising:

exposing an ophthalmic lens formed from a single volume of reactive mixture comprising a high molecular weight hydrophilic polymer, a hydroxyl-functionalized silicone containing monomer and hydrophilic monomers to a first aqueous solution comprising about 5% or more of a first leaching agent comprising one or more of: $C_{12-14}$ fatty alcohol ethoxylated with 10 ethylene oxides: polyoxyethylene-2-ethyl hexyl ether; and sodium dodecyl sulfate; and wherein the first aqueous solution additionally comprises 5% or more of a second leaching agent comprising a blend of water, cocoamidopropylamine oxide and glycerin;

heating said first aqueous solution to which the ophthalmic lens is exposed; and rinsing said ophthalmic lens through contact with a second aqueous solution until said lens comprises a level of unreacted components and diluents that is below a predetermined threshold.

2. The method according to claim 1, wherein the lens is exposed to the first aqueous solution for approximately 60 minutes or more.

3. The method according to claim 1, wherein said second liquid comprises deionized water.

4. The method according to claim 1, wherein said first liquid, said second liquid, or both comprise a buffered aqueous solution.

5. The method according to claim 4, wherein said first liquid, said second liquid, or both comprise sodium chloride, boric acid, sodium borate, dihydrogen sodium phosphate, sodium citrate, sodium acetate, sodium bicarbonate or any combination thereof.

6. The method according to claim 1, wherein the predetermined threshold comprises a threshold of detection of unreacted components and diluents.

7. The method according to claim 1, wherein said ophthalmic lens comprises a contact lens comprising from 0 to about 90 percent water.

8. The method according to claim 1, wherein said ophthalmic lens further comprises a diluent and said method further comprises removing said diluent from said ophthalmic lens.

9. The method according to claim 8, wherein said ophthalmic lens has a functional size and swells during said diluent removal.

10. The method according to claim 1, wherein said ophthalmic lens is tinted.

11. The method according to claim 1, wherein said ophthalmic lens comprises a pattern of colorant.

12. The method of claim 1, wherein the ophthalmic lens is formed from a reaction mixture comprising a high molecular weight hydrophilic polymer and an effective amount of an hydroxyl-functionalized silicone-containing monomer.

13. The method of claim 1, wherein the ophthalmic lens is formed from a reaction mixture comprising about 1% to about 15% high molecular weight hydrophilic polymer.

14. The method of claim 1 additionally comprising the step of forming the ophthalmic lens by curing a monomer comprising of the group consisting of: poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrro-lidone, polyvinylimidazole, poly-N—N-dimethylacrylamide, polyvinyl alcohol, polyacrylic acid, polyethylene oxide, poly 2 ethyl oxazoline, heparin polysaccharides, polysaccharides, mixtures and copolymers thereof.

15. The method of claim 1 wherein the step of rinsing the ophthalmic lens comprises exposing the ophthalmic lens three times to at least 50 ml of deionized water.

16. The method of claim 1 additionally comprising the step of forming the ophthalmic lens by curing a monomer comprising of the group consisting of: N,N-dimethylacrylamide, 2-hydroxyethyl methacrylate, glycerol methacrylate, 2-hydroxyethyl methacrylamide, polyethyleneglycol monomethacrylate, methacrylic acid, acrylic acid, N-vinyl pyrrolidone, N-vinyl-N-methyl acetamide, N-vinyl-N-ethyl acetamide, N-vinyl-N-ethyl formamide, N-vinyl formamide, hydrophilic vinyl carbonate monomers, vinyl carbamate monomers, hydrophilic oxazolone monomers and polydextran.

17. The method of claim 1 wherein the first aqueous solution is heated to about 55° C. or more.

18. The method of claim 1 wherein the step of exposing said ophthalmic lens to a first aqueous solution comprises immersing the lens in the first aqueous solution.

19. The method of claim 1 wherein the step of exposing said ophthalmic lens to a first aqueous solution comprises flowing the first aqueous solution over the lens.

* * * * *

UNITED STATES PATENT AND TRADEMARK OFFICE
CERTIFICATE OF CORRECTION

PATENT NO. : 7,776,238 B2  
APPLICATION NO. : 11/612545  
DATED : August 17, 2010  
INVENTOR(S) : Vanderlaan et al.

Page 1 of 1

It is certified that error appears in the above-identified patent and that said Letters Patent is hereby corrected as shown below:

Title Page  
On page 1, paragraph Item (76) Inventors, please replace line 5 as follows:  
"Ford, 515 Nessau Ct., Orange Park, FL" with -- Ford, 515 N<u>a</u>ssau Ct., Orange Park, FL --

On page 1, paragraph Item (76) Inventors, please replace line 7 as follows:  
"Wildhorn Dr., Orange Park, FL (US)" with -- Wild<u>fern</u> Dr., Orange Park, FL (US) --

Signed and Sealed this  
Eighteenth Day of January, 2011

David J. Kappos  
*Director of the United States Patent and Trademark Office*